(12) United States Patent
Band et al.

(10) Patent No.: US 7,293,935 B2
(45) Date of Patent: Nov. 13, 2007

(54) CONNECTOR SYSTEM

(76) Inventors: Richard Band, Boschstrassse 3, 91183 Abenberg (DE); Franz Band, Ringstrasse 71, 90559 Burgthann (DE)

( * ) Notice: Subject to any disclaimer, the term of this patent is extended or adjusted under 35 U.S.C. 154(b) by 217 days.

(21) Appl. No.: 10/974,937

(22) Filed: Oct. 28, 2004

(65) Prior Publication Data

US 2005/0260032 A1    Nov. 24, 2005

(30) Foreign Application Priority Data

May 18, 2004    (EP)    .................. 04011750

(51) Int. Cl.
  *F16B 9/00*    (2006.01)
(52) U.S. Cl. ..................... 403/254; 403/255; 403/257; 403/258; 403/259
(58) Field of Classification Search ................ 403/252, 403/253, 254, 255, 256, 257, 258, 259, 363; 411/84, 85, 104
See application file for complete search history.

(56) References Cited

U.S. PATENT DOCUMENTS 5,192,145 A *  3/1993  Rixen et al. ................ 403/255
6,382,866 B1 *  5/2002  Zihlmann ................... 403/255
6,712,540 B2 *  3/2004  Schmalzhofer et al. ..... 403/252

FOREIGN PATENT DOCUMENTS

DE          4016320 C      9/1991
DE          19534034 A     3/1997
DE          10200964 A     7/2003

* cited by examiner

*Primary Examiner*—Daniel P. Stodola
*Assistant Examiner*—Michael P. Ferguson
(74) *Attorney, Agent, or Firm*—Jean C. Edwards; Akerman Senterfitt

(57) ABSTRACT

A connector system that provides a profile connection having two profiled rods that are to be connected to one another and that each comprise at least one undercut, longitudinally oriented profile groove. The connector system may include a connecting screw with a screw head and a screw shaft as well as a threaded sleeve. The connecting screw is dimensioned such that it passes through the threaded sleeve and with part of its shaft, by way of the sleeve, can be engaged with a thrust bearing piece in the profile groove of the second profiled rod. The connecting screw is fixed in the threaded sleeve by a releasable anchoring element so as to be ready for installation. Thus, an assembly unit is created that can be screwed as a whole into the profile groove of the first profiled rod.

13 Claims, 3 Drawing Sheets

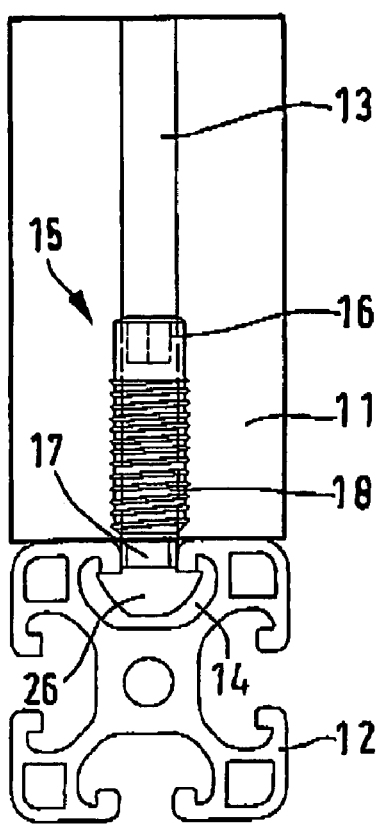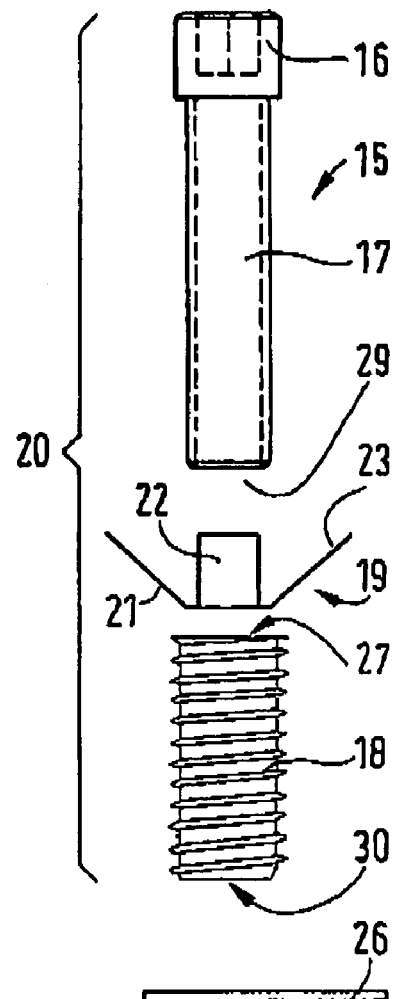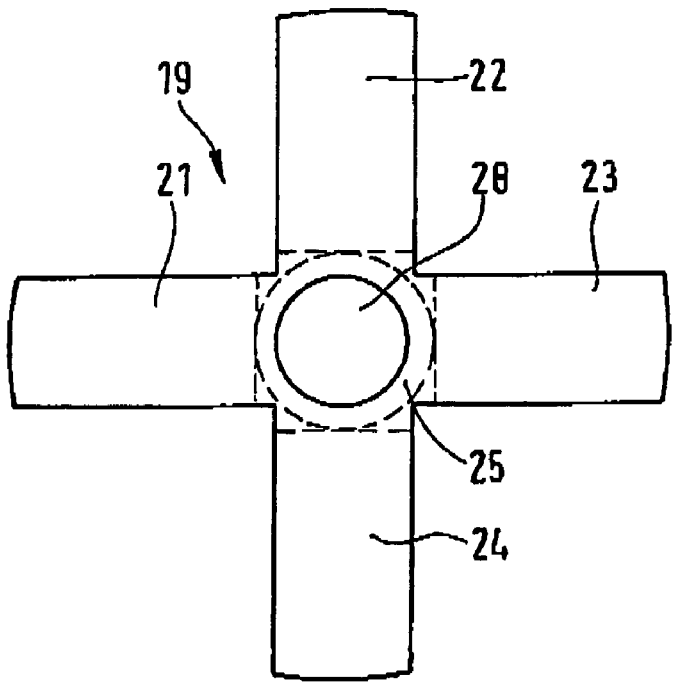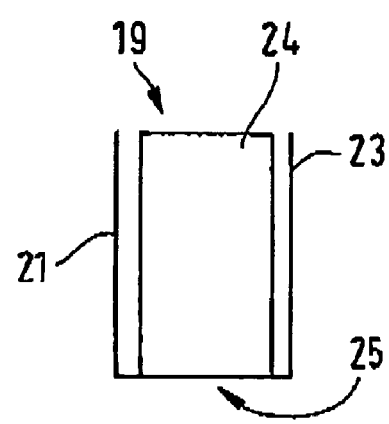
FIG. 1
FIG. 2
FIG. 3
FIG. 4

CONNECTOR SYSTEM

This application claims priority to European application 04011750.9, filed May 18, 2004, the entire contents of which is incorporated herein by reference.

FIELD OF THE INVENTION

The invention relates to a connector system. More particularly, the system provides a connector screw that is fixed in the threaded sleeve using a releasable fixation, so as to create an assembly unit such that the assembly unit can be screwed as a whole into the profile groove of the first profiled rod.

BACKGROUND OF THE INVENTION

Connector systems of this kind are known in the state of the art. The installation of conventional connector systems in the profile groove of a profiled rod is conventionally performed as follows. The threaded sleeve is screwed into the profile groove, prior to which the connecting screw must be introduced into the profile groove, in the correct orientation. After the threaded sleeve has been rotated into place, the connecting screw must be guided through the threaded sleeve. In this process the connecting screw must be put into an intermediate position, so that it enters the internal bore of the threaded sleeve exactly, without encountering the bearing shoulder of the threaded sleeve. Furthermore, it can happen that the connecting screw has been correctly inserted but is not immediately brought into engagement with a thrust-bearing component in the profile groove of the second profiled rod, because other assembly work must be finished first; in this case there is the additional risk that the connecting screw will fall out of the threaded sleeve and possibly, insofar as the profile groove of the profiled rod is open at its distal end during the assembly process, can even fall out of the profile groove. This makes the assembly process time-consuming, as well as relatively complicated and expensive to automate.

SUMMARY OF THE INVENTION

The invention provides a system to simplify the previously elaborate procedure of positioning the connecting screw in the profile groove, and to avoid an undesirable displacement of the connecting screw within the profile groove, and to avoid an undesirable displacement of the connecting screw within the profile groove.

This objective is achieved with a connector system that is designed and intended for a profile connection having two profiled rods made of metal, in particular of aluminum, that are to be connected to one another and that each include at least one undercut, longitudinally oriented profile groove, such that said connector system includes a connecting screw with a screw head and a screw shaft as well as a threaded sleeve. The connecting screw is dimensioned such that it passes through the threaded sleeve and with part of its shaft, by way of the sleeve, can be engaged with a thrust-bearing piece in the profile groove of the second profiled rod. The connecting screw is fixed in the threaded sleeve by releasable fixation structure, so as to create an assembly unit such that the assembly unit can be screwed as a whole into the profile groove of the first profiled rod Advantageous further developments are presented in the subordinate claims.

It is a central idea of the present invention to prevent the connecting screw from sliding out of position, by releasable fixing it within the profile groove. Whereas many advantages already result from this idea in general, i.e. the releasable fixation of the connecting screw in the profile groove, there is also provided a particular means of fixing the connecting screw releasable within the threaded sleeve, so that connecting screw and threaded sleeve can be introduced into the profile groove together, as an assembly unit. This measure not only achieves a releasable fixation of the connecting screw in the profile groove, but in addition the assembly process as a whole is facilitated, because it is no longer necessary to carry out two separate steps, introducing first the connecting screw and then the threaded sleeve; instead, both are inserted in a single step. At the same time, the head of the connecting screw can serve as a centering means while the threaded sleeve is being inserted, so that the process of screwing in the threaded sleeve is made easier and it cannot be screwed in at a slant.

The fixation means that holds the threaded sleeve to the connecting screw during insertion of the sleeve can be released before the connecting screw is screwed into a thrust-bearing component in the profile groove of the second profiled rod.

It is advantageous for the fixation means to be releasable by applying a prespecified force to the head of the connecting screw. One possibility is to release the fixation means by engaging a tool with the screw head so as to apply a prespecified moment of torque. Alternatively, an axial force can be exerted on the screw head, preferably in the connection direction, so that a fixation means is released, in particular broken apart or pushed out of the threaded sleeve. In a first preferred embodiment the fixation means comprises a clamping piece, preferably made of plastic.

In an alternative design the fixation means can also comprise a sticky substance and/or a fluid or pasty material that hardens, based for example on a lacquer, silicone or adhesive.

If the screw head has a certain axial length and its diameter is matched to the inside diameter of the profile groove of the profiled rod, which is preferred according to a special design of the present invention, the connecting screw can serve as a guide and/or centering element as the connecting sleeve is being screwed in. Thus the connecting screw keeps the threaded sleeve precisely parallel as it enters the profile groove of the profiled rod, so that the threaded sleeve is prevented from being screwed into the profile groove at an angle. Previously known threaded sleeves have a centering collar at the top of the sleeve, which is usually relatively short because for every millimeter taken up by the length of the centering collar, inevitably the length of the sleeve that remains available for threading is reduced. Therefore a centering collar always entails a compromise at the expense of the firmness with which the threaded sleeve can be screwed in. A threaded sleeve with molded or cut threading can very easily be inserted at a slant into the profile groove if it is not guided precisely. This risk is present especially when the threaded sleeves are being screwed in by layman.

Because according to the advantageous aspect of the invention described here the connecting screw assists the guidance of the threaded sleeve, this entire set of problems is eliminated, so that it is no longer necessary to provide a centering collar on the side of the threaded sleeve that is directed forward, in the insertion direction. Hence according to one aspect of the present invention it is also possible to employ a threaded sleeve without centering collar.

According to another aspect of the present invention the connecting screw is positioned within the threaded sleeve, by way of the fixation means, in such a way that in the direction in which it is inserted into the profile groove it projects outward not only with its screw head, but also with part of its screw shaft. Because the distance of the screw head from the sleeve is therefore greater, the guidance parallel to the profile groove during the screwing-in process is substantially improved. A substantially parallel guidance is also achieved, because of the increased distance, if there is a degree of play between the outside diameter of the screw head and the inside diameter of the profile groove.

An especially preferred design is one in which the connecting screw projects above the threaded sleeve over at least half of the length of its screw shaft.

The clamping piece can in principle be provided in any form that is suitable for the particular application. In a special, but by no means compulsory design, the clamping piece comprises several clamp flaps/lobes, connected to one another by way of a central connecting section.

In a special design the clamp flaps have a thickness of 0.3 to 0.5 mm, preferably about 0.4 mm.

According to a likewise preferred but by no means obligatory aspect of the invention, the clamping piece is constructed as a single piece.

BRIEF DESCRIPTION OF THE DRAWINGS

In the following the invention is explained, also with respect to additional characteristics and advantages, by a description of exemplary embodiments with reference to the attached drawings, wherein FIG. 1 shows a profile connection known per se, in which a connector system in accordance with the present invention can be used, FIG. 2 shows an embodiment of the connector system in accordance with the present invention in combination with a tenon block, in an exploded view, FIG. 3 shows in plan view the fixation means used in the connector system according to FIG. 2, in an unfolded state, FIG. 4 shows the fixation means according to FIG. 3 in a side view, while folded together as it appears during the assembly process.

DETAILED DESCRIPTION OF THE INVENTION

Figure 5:
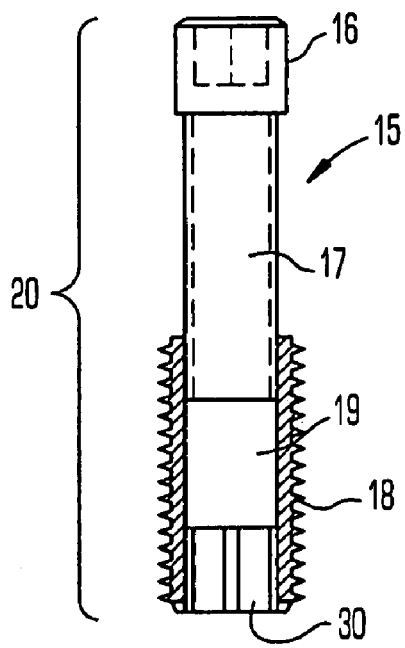
FIG. 5 is a sectional view through the connector system shown in FIG. 2.

The introductory drawing in FIG. 1 shows a profile connection in which the present connector system can be used. By way of the connector system and a thrust-bearing piece constructed as a tenon block 26, two profiled rods 11, 12 are screwed together so as to be orthogonally aligned with one another. Each of the profiled rods 11, 12 comprises at least one undercut profile groove 13, 14, here shown specifically as four undercut profile grooves in each case. Screwed into the profile groove 13 of the first profiled rod 11 is a threaded sleeve 18 with an internal bore 27. By way of this internal bore 27 a connecting screw 15, comprising a screw head 16 and a screw shaft 17, has been guided through the threaded sleeve 18 so as to hold the sleeve 18 firmly within the profile groove 13 in the direction in which the connection is to be made. The shaft 17 of the connecting screw 15 extends beyond the threaded sleeve 18, into the profile groove 14 of the second profiled rod 12, and engages a tenon block 26 that is seated there. Hence when the connecting screw 15 is tightened, the first and second profiled rods 11, 12 can be screwed firmly together.

In FIG. 2 the connector system, which can be used for example to create a profile connection like that shown in FIG. 1, is illustrated by an exploded drawing. In the present embodiment the connector system consists of three parts, namely the connecting screw 15, the threaded sleeve 18 and a fixation means, which here is specifically constructed as a single piece made of plastic, the clamping element 19. By means of the clamping element 19 the connecting screw 15 can be releasably fixed within the internal bore 27 of the threaded sleeve 18. The individual components that are releasably connected to one another by means of the clamping element, namely the connecting screw 15, clamping element 19 and threaded sleeve 18, thus constitute an assembly unit 20, so that the connecting screw 15 and threaded sleeve 18 can be inserted into the groove 13 of the profiled rod 11 as a unit, with the screw 15 and sleeve 18 in predetermined positions relative to one another. After the threaded sleeve 18 has been inserted into the profile groove 13, the clamping element 19 can be pressed out of the threaded sleeve 18 by applying a prespecified axial force to the screw head 16 in the connection direction, so that the connecting screw 15 becomes freely rotatable with respect to the threaded sleeve 18 and can be screwed into the tenon block 26.

In FIG. 3 the clamping element 19 of FIG. 2 is shown in plan view when it is unfolded. The clamping element 19, which in the preceding embodiment can be formed, preferably stamped out, as a single piece of plastic, comprises four clamping flaps 21 to 24, which are joined to one another by way of a central connecting section 25. In the central connecting section 25 a central aperture 28 can be disposed. The remaining region of the central connecting section 25 serves as a surface against which the lower end 29 of the screw shaft 17 can be braced. The clamping element 19 is preferably about 0.4 mm thick. As illustrated in FIG. 4, the clamping flaps 21 to 24 can be folded towards one another, so that the end face 29 as well as the adjacent region of the screw shaft 17 are enclosed within the clamping element 19, and the clamping element 19, having been thus folded together, can be inserted together with the end face 29 and an adjacent section of the screw shaft 17 into the internal bore 27 of the threaded sleeve 18, as is shown in the sectional view according to FIG. 5. In this drawing the clamping element has been pushed into the internal bore 27 of the threaded sleeve 18 far enough that at least one tool engagement point 30, which is formed in the internal bore 27, remains accessible so that a tool (not shown) can be used to screw the assembly unit 20, consisting of the connection screw 15, threaded sleeve 18 and clamping element 19, into the profile groove 13 of a profiled rod 11.

Figure 8:
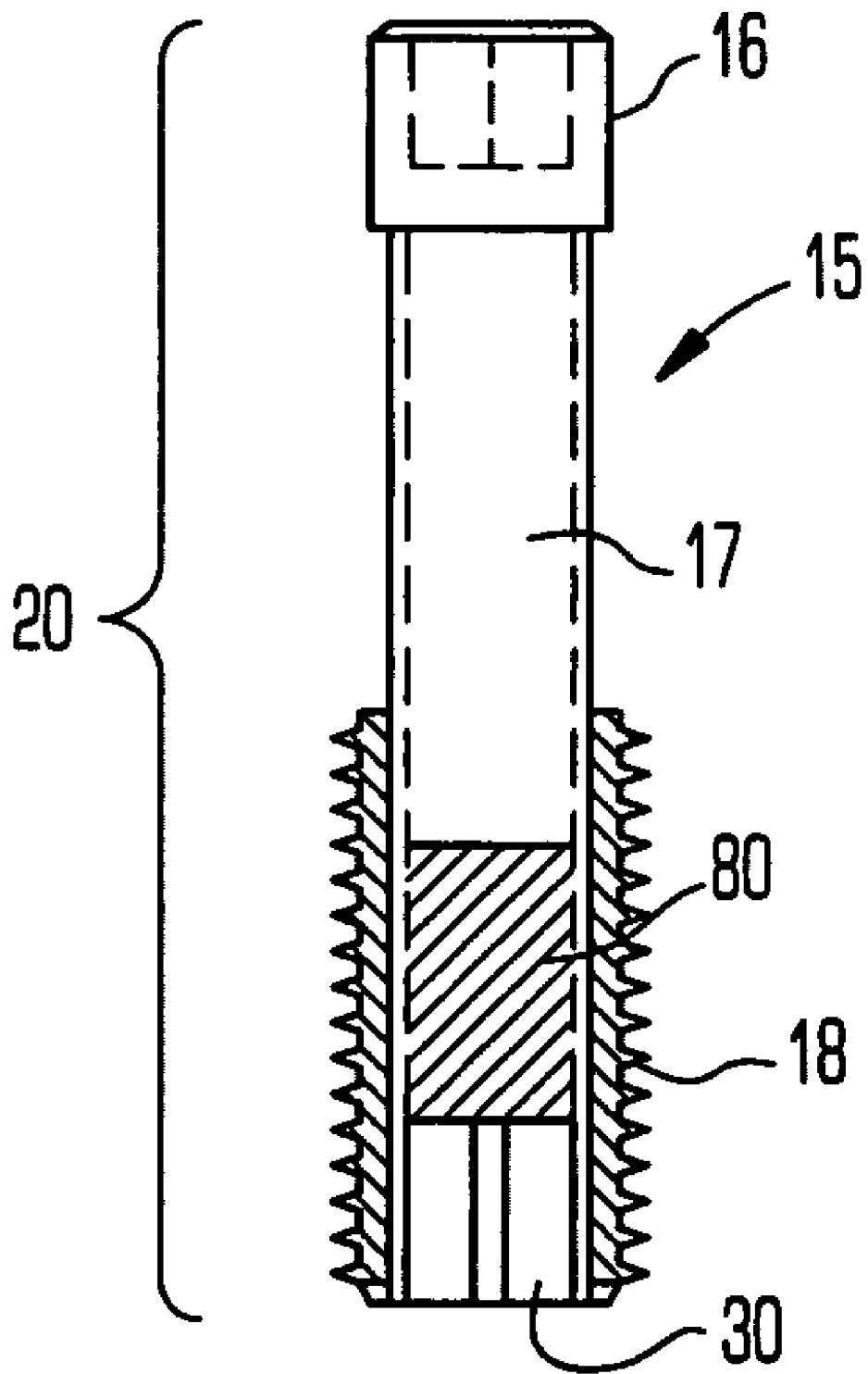
FIG. 8 shows the fixation means being an adhesive and/or hardening, fluid or pasty substance.

FIG. 8 illustrates an alternative design for the fixation means to include a sticky substance and/or a fluid or pasty material 80 that hardens, based for example on a lacquer, silicone or adhesive.

Figure 6:
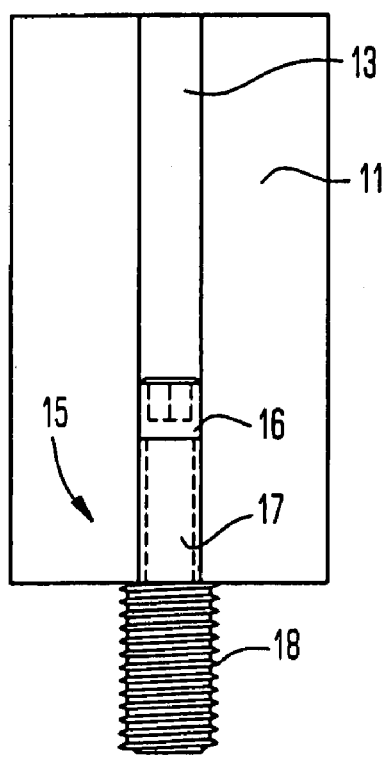
FIG. 6 is a schematic view of the connector system according to FIG. 5, when it has been partially inserted into the profile groove of a profiled rod.

The procedure for guiding the assembly unit 20 into the profile groove 13 of the profiled rod 11 is illustrated in FIG. 6. During this procedure more than half the length of the shaft 17 of the connecting screw 15 projects beyond the threaded sleeve 18, so that the connecting screw 15 provides an extremely effective centering and guidance means. The threaded sleeve 18 is subsequently screwed into the profile groove 13 of the profiled rod 11, by applying pressure such that threading is produced therein by deformation. It is preferable to screw the threaded sleeve 18 in by a pressing process so that the detachment of chips is avoided; however, other methods have already been proposed in the state of the art for anchoring a threaded sleeve 18 in a profile groove 13 of a profiled rod 11. It is obvious that for the connector system according to the present invention these other, previously known methods as well as, in some circumstances, additional methods not yet proposed can be used for anchoring a threaded sleeve 18 in a profile groove 13 of a profiled rod 11.

Figure 7:
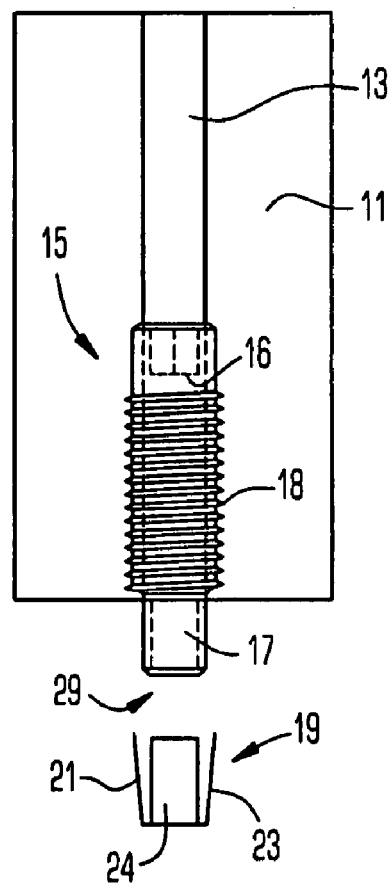
FIG. 7 shows the connector system according to FIG. 6 after it has penetrated the profile groove.

FIG. 7, finally, illustrates schematically the threaded sleeve 18 after it has been anchored in the profile groove 13; here the clamping element 19 has been pressed out of the threaded sleeve 18 in the axial direction owing to the impact of the head 16 of the connecting screw 15, so that the connecting screw 15 can now be rotated freely with respect to the threaded sleeve 18 and part of its screw shaft 17 projects beyond the profiled rod 11, to engage a tenon block 26 in a profile groove 14 of a second profiled rod 12 (cf. FIG. 1).

The invention claimed is:

1. A connector system that provides a profile connection comprising:
   a first profiled rod that includes at least one first undercut and a longitudinally oriented first profile groove;
   a second profiled rod that is configured to be connected to the first profiled rod, the second profiled rod including at least one second undercut and a longitudinally oriented second profile groove;
   a connecting screw that includes a screw head and a screw shaft;
   a threaded sleeve that is positioned in the first profile groove, wherein the connecting screw is dimensioned such that the screw shaft passes through the threaded sleeve and engages a thrust-bearing piece that is positioned in the second profile groove; and
   an anchoring element that is provided in the threaded sleeve to anchor the connecting screw to the threaded sleeve, wherein the anchoring element is releasable by applying pressure to the connecting screw in an axial direction.

2. The connector system according to claim 1, wherein the anchoring element comprises a clamping element.

3. The connector system according to claim 2, wherein the clamping element is constructed in one piece.

4. The connector system according to claim 2, wherein the clamping element is made of plastic.

5. The connector system according to claim 1, wherein the anchoring element comprises an adhesive and one of a hardening fluid and pasty substance.

6. The connector system according to claim 1, wherein the anchoring element is released by applying a prespecified force to the screw head of the connecting screw.

7. The connector system according to claim 1, wherein the screw head is matched in its diameter size to an inside diameter size of the first profile groove in such a way that the connecting screw that is fixed within the threaded sleeve using the anchoring element serves as at least one of a guide and a centering element during a screwing-in procedure.

8. The connector system according to claim 1, wherein the connecting screw is positioned within the threaded sleeve using the anchoring element, in such a way that the connecting screw projects into the first profile groove in an insertion direction using both the screw head and a portion of the screw shaft.

9. The connector system according to claim 8, wherein the connecting screw projects beyond the threaded sleeve over at least half the length of the screw shaft.

10. The connector system according to claim 1, wherein the first profiled rod and the second profiled rod are made of metal.

11. A connector system that provides a profile connection comprising:
    a first profiled rod that includes at least one first undercut and a longitudinally oriented first profile groove;
    a second profiled rod that is configured to be connected to the first profiled rod, the second profiled rod including at least one second undercut and a longitudinally oriented second profile groove;
    a connecting screw that includes a screw head and a screw shaft;
    a threaded sleeve that is positioned in the first profile groove, wherein the connecting screw is dimensioned such that the screw shaft passes through the threaded sleeve and engages a thrust-bearing piece that is positioned in the second profile groove; and
    an anchoring element that is provided in the threaded sleeve to anchor the connecting screw to the threaded sleeve, wherein the anchoring element is releasable by applying pressure to the connecting screw in an axial direction, wherein the anchoring element comprises a clamping element, and wherein the clamping element comprises a plurality of clamping flaps, which are connected to one another by way of a central connecting section.

12. The connector system according to claim 11, wherein the clamping flaps have a thickness of between 0.3 mm to 0.5 mm.

13. The connector system according to claim 11, wherein the clamping flaps have a thickness of substantially 0.4 mm.

* * * * *